(12) United States Patent
Kim et al.

(10) Patent No.: US 8,964,688 B2
(45) Date of Patent: Feb. 24, 2015

(54) METHOD AND DEVICE FOR EFFECTING UPLINK HARQ ON A WIRELESS COMMUNICATIONS SYSTEM

(75) Inventors: So Yeon Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 13/260,230

(22) PCT Filed: Apr. 2, 2010

(86) PCT No.: PCT/KR2010/002050
§ 371 (c)(1),
(2), (4) Date: Sep. 23, 2011

(87) PCT Pub. No.: WO2010/114340
PCT Pub. Date: Oct. 7, 2010

(65) Prior Publication Data
US 2012/0026963 A1    Feb. 2, 2012

Related U.S. Application Data

(60) Provisional application No. 61/166,256, filed on Apr. 3, 2009.

(30) Foreign Application Priority Data

Apr. 2, 2010  (KR) .................. 10-2010-0030542

(51) Int. Cl.
*H04B 7/216* (2006.01)
*H04L 1/00* (2006.01)
*H04L 1/18* (2006.01)

(52) U.S. Cl.
CPC ............ *H04L 1/1812* (2013.01); *H04L 1/1896* (2013.01)
USPC .......................................... 370/330; 714/746

(58) Field of Classification Search
USPC ................. 370/328–330, 335–338, 341–348; 714/746–749, 751–755, 798–818; 455/450–452.2
See application file for complete search history.

(56) References Cited

U.S. PATENT DOCUMENTS

| | | | |
|---|---|---|---|
| 7,676,732 B2* | 3/2010 | Moon et al. ................... | 714/774 |
| 8,249,011 B2* | 8/2012 | Lindoff et al. ................ | 370/329 |
| 8,335,233 B2* | 12/2012 | Ishii .............................. | 370/465 |
| 8,391,219 B2* | 3/2013 | Ishii et al. ..................... | 370/329 |
| 8,432,883 B2* | 4/2013 | Ishii .............................. | 370/343 |
| 2002/0049068 A1 | 4/2002 | Koo et al. | |
| 2010/0115358 A1* | 5/2010 | Kotecha et al. ............... | 714/748 |

(Continued)

FOREIGN PATENT DOCUMENTS

| KR | 1020020037901 | 5/2002 |
|---|---|---|
| KR | 1020040026231 | 3/2004 |

(Continued)

*Primary Examiner* — Thai Hoang
(74) *Attorney, Agent, or Firm* — Lee, Hong, Degerman, Kang & Waimey

(57) ABSTRACT

The present invention provides a method and device for effecting uplink HARQ (hybrid automatic repeat request) on a wireless communications system. A terminal receives HARQ setting data from a base station. If the terminal receives a NAC signal for an initial transmission block, the transmission characteristics of a retransmission block for the initial transmission block are adjusted on the basis of the HARQ setting data.

12 Claims, 11 Drawing Sheets

(56) References Cited

U.S. PATENT DOCUMENTS

2011/0103335 A1* 5/2011 Golitschek Edler Von Elbwart et al. ............ 370/329
2011/0103338 A1* 5/2011 Astely et al. ............ 370/329
2011/0107169 A1* 5/2011 Lohr et al. ............ 714/748

FOREIGN PATENT DOCUMENTS

| KR | 1020040084212 | 10/2004 |
|----|---------------|---------|
| KR | 1020070059782 | 6/2007  |

* cited by examiner

METHOD AND DEVICE FOR EFFECTING UPLINK HARQ ON A WIRELESS COMMUNICATIONS SYSTEM

CROSS-REFERENCE TO RELATED APPLICATIONS

This application is the National Stage filing under 35 U.S.C. 371 of International Application No. PCT/KR2010/002050, filed on Apr. 2, 2010, which claims the benefit of earlier filing date and right of priority to Korean Patent Application No. 10-2010-0030542, filed on Apr. 2, 2010, and also claims the benefit of U.S. Provisional Application Serial No. 61/166,256, filed on Apr. 3, 2009, the contents of which are all hereby incorporated by reference herein in their entirety.

TECHNICAL FIELD

The present invention relates to wireless communication, and more particularly, to a method and apparatus for performing an uplink hybrid automatic repeat request (HARQ) in a wireless communications system.

BACKGROUND ART

There are a forward error correction (FEC) scheme and an automatic repeat request (ARQ) scheme to compensate errors and to secure reliability of communication. In the case of the FEC scheme, redundant error correction codes are added to information bits to thereby correct errors at a receiving end. The FEC scheme has an advantage in that time delay is low and information separately transmitted and received between a transmitting end and a receiving end is not required; however, it has a disadvantage in that system efficiency is low in a good channel environment. The ARQ scheme may have high transmission reliability; however, it has a disadvantage in that time delay occurs and system efficiency is low in a poor channel environment.

A hybrid automatic repeat request (HARQ) scheme, which is a combination scheme of the FEC scheme and the ARQ scheme, improves performance by confirming whether or not data received in a physical layer includes an error that may not be reproduced and requesting retransmission when the data includes the error.

When the error is not detected in the received data, a receiver transmits a positive acknowledgement (ACK) signal as reception acknowledgement to inform a transmitter that it successfully receives the data. When the error is detected in the received data, the receiver transmits a negative acknowledgement (NACK) signal as the reception acknowledgement to thereby inform the transmitter that it detects the error. When the transmitter receives the NACK signal, it may retransmit the data.

The long term evolution (LTE) based on the 3rd generation partnership project (3GPP) technical specification (TS) release 8 is the leading next generation telecommunication standard.

The 3GPP LTE supports the HARQ in both of uplink transmission and downlink transmission. The downlink HARQ indicates that when a base station transmits downlink data, a user equipment transmits an ACK/NACK signal for the downlink data. The uplink HARQ indicates that when the user equipment transmits uplink data, the base station transmits an ACK/NACK signal for the uplink data.

Discussion on the 3GPP LTE-Advanced (LTE-A), which is advancement of the 3GPP LTE, has been recently conducted. As a newly added representative technology in the LTE-A system, there are carrier aggregation, a relay, and uplink multiple input multiple output (MIMO). The carrier aggregation is used to flexibly extent a usable bandwidth. The relay increases coverage of a cell, supports group mobility, and enables user-centric network disposition. The uplink MIMO increases a data rate by supporting multiple antennas, in contrast with the LTE supporting only a single antenna in the uplink transmission.

A method for improving performance of the HARQ in the 3GPP LTE-A in which a new technology is introduced is suggested.

DISCLOSURE

Technical Problem

The present invention provides a method and a device for performing uplink HARQ on a wireless communications system.

The present invention also provides a method and a device for performing synchronous/adaptive uplink HARQ on a wireless communications system.

Technical Solution

In an aspect, a method for performing an uplink hybrid automatic repeat request (HARQ) in a wireless communications system is provided. The method includes receiving, by a user equipment, HARQ configuration information from a base station, receiving, by the user equipment, an uplink resource allocation from the base station, transmitting, by the user equipment, an initial transmission block on an uplink data channel using the uplink resource allocation to the base station, receiving, by the user equipment, an ACK/NACK signal for the initial transmission block from the base station, wherein a radio resource used for transmission of the ACK/NACK signal is determined based on a radio resource used for transmission of the uplink data channel, adjusting a transmission attribute of a retransmission block for the initial transmission block based on the HARQ configuration information if the ACK/NACK signal is an NACK signal, and transmitting, by the user equipment, the retransmission block to the base station.

The transmission attribute of the retransmission block may be at least one of a rank, a modulation order, a number of resource blocks, and a transmission power.

The HARQ configuration information may set a rank of the retransmission block so as to be lower than a rank of the initial transmission block.

The HARQ configuration information may set a modulation order of the retransmission block so as to be lower than a modulation order of the initial transmission block.

The retransmission block may be transmitted to the base station at a predetermined HARQ period.

In another aspect, a user equipment for performing an uplink hybrid automatic repeat request (HARQ) in a wireless communications system is provided. The user equipment includes a transmitting unit configured to transmit an initial transmission block or a retransmission block on a physical uplink shared channel (PUSCH), a receiving unit configured to receive an ACK/NACK signal for the initial transmission block on a physical hybrid-ARQ indicator channel (PHICH), and a HARQ entity configured to instruct a transmission of the retransmission block for the initial transmission block and lower at least any one of a rank and a modulation order that are used for transmission of the retransmission block as compared to a rank and a modulation order that are used for transmission of the initial transmission block.

The transmitting unit may be configured to transmit the retransmission block to the base station at a predetermined HARQ period.

Advantageous Effects

A multi-antenna is introduced to adaptively perform the HARQ, thereby making it possible to improve efficiency of the system.

MODE FOR INVENTION

Figure 1:
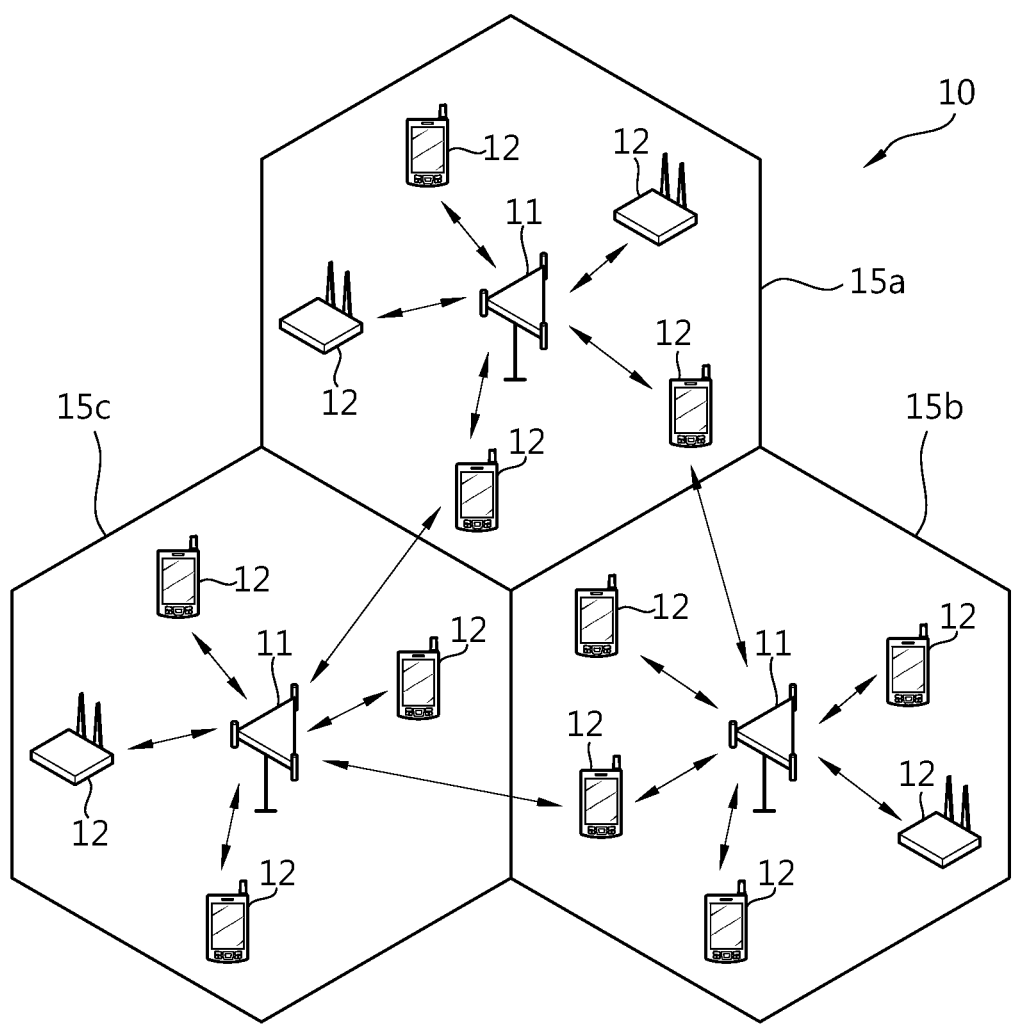
FIG. 1 shows a wireless communications System.

FIG. 1 shows a wireless communications system. A wireless communications system 10 includes at least one base station (BS) 11. Each base station 11 provides communication services to specific geographical areas (generally, referred to as a cell) 15a, 15b, and 15c. A cell may again be divided into a plurality of areas (referred to as a sector).

A user equipment (UE) 12 may be fixed or have mobility and may be referred to as other terms, such as a mobile station (MS), a mobile terminal (MT), a user terminal (UT), a subscriber station (SS), a wireless device, a personal digital assistant (PDA), a wireless modem, a handheld device, or the like.

The base station 11 generally indicates a fixed station communicating with the user equipment 12 and may be referred to as other terms, such as an evolved-node B (eNB), a base transceiver system (BTS), an access point, or the like.

Hereinafter, a downlink means communication from the base station to the user equipment and an uplink means communication from the user equipment to the base station. In the downlink, a transmitter may be a portion of the base station and a receiver may be a portion of the user equipment. In the uplink, the transmitter may be a portion of the user equipment and the receiver may be a portion of the base station.

Figure 2:
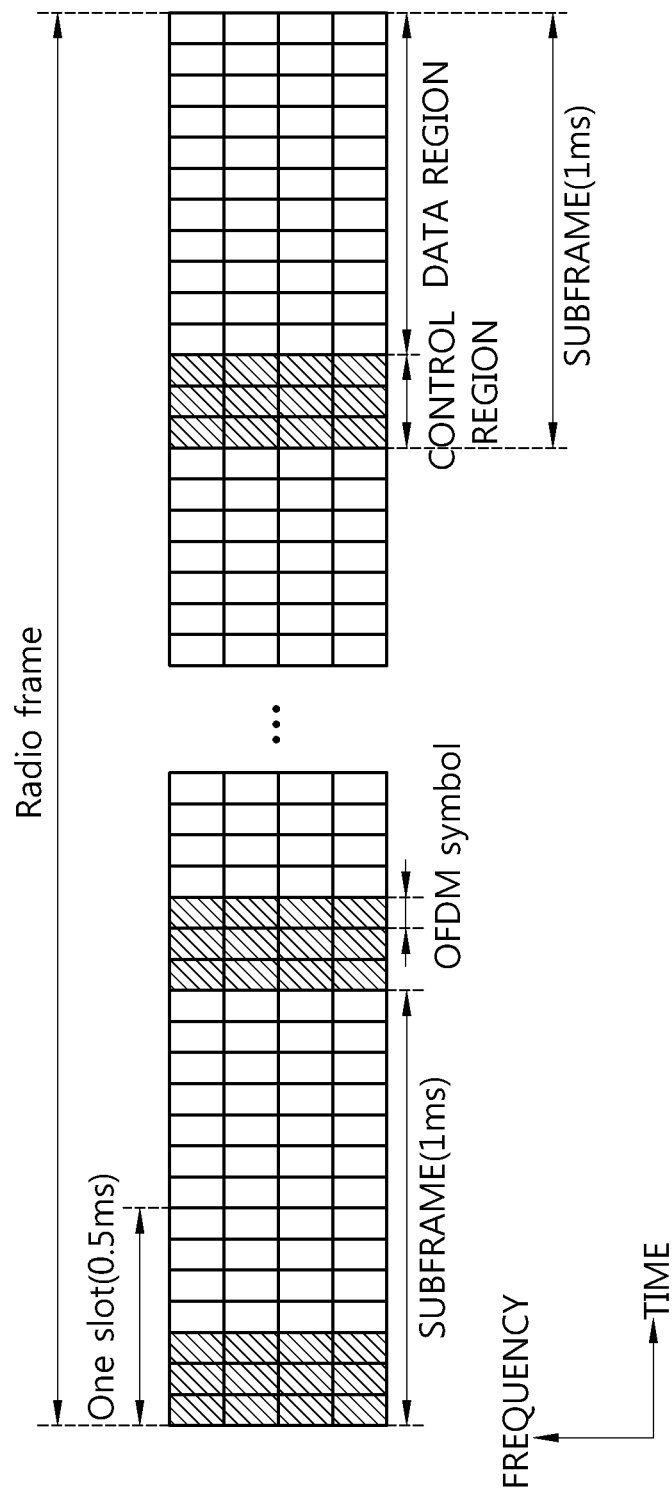
FIG. 2 shows a structure of a wireless frame in the 3GPP LTE.

FIG. 2 shows a structure of a wireless frame in the 3GPP LTE. This may refer to section 6 of 3GPP TS 36.211 V8.5.0 (2008-12) "Evolved Universal Terrestrial Radio Access (E-UTRA); Physical Channels and Modulation (Release 8)". A radio frame includes ten subframes indexed from 0 to 9, and one subframe includes two slots. A time required to transmit one subframe is referred to as a transmission time interval (TTI). For example, a length of one subframe may be 1 ms, and a length of one slot may be 0.5 ms.

One slot may include a plurality of orthogonal frequency division multiplexing (OFDM) symbols in a time domain. The OFDM symbol is only to represent one symbol period in the time domain since the 3GPP LTE uses orthogonal frequency division multiple access (OFDMA) in the downlink. That is, there is no limitation in a multiple access scheme or name. For example, the OFDM symbol may be referred to as other names such as a single carrier frequency division multiple access (SC-FDMA) symbol, a symbol period, or the like.

Although a case in which one slot includes seven OFDM symbols is described by way of example, the number of OFDM symbols included in one slot may be changed according to a length of cyclic prefix (CP). According to the 3GPP TS 36.211 V8.5.0 (2008-12), one subframe includes seven OFDM symbols at a normal CP and one subframe includes six OFDM symbols at an expanded CP.

A resource block (RB), which is a resource allocation unit, includes a plurality of subcarriers in one slot. For example, when one slot includes seven OFDM symbols in the time domain and the resource block include twelve subcarriers in a frequency domain, one resource block may include 7×12 resource elements (REs).

The subframe is divided into a control region and a data region in the time domain. The control region includes at most four previous OFDM symbols of a first slot within the subframe. However, the number of OFDM symbols included in the control region may be changed. A physical downlink control channel (PDDCH) is allocated to the control region, and a physical downlink shared channel (PDSCH) is allocated to the data region.

As disclosed in 3GPP TS 36.211 V8.5.0 (2008-12), in the LTE, a physical channel may be divided into a physical downlink shared channel (PDSCH) and a physical uplink shared channel (PUSCH), which are data channels, and a physical downlink control channel (PDCCH), a physical control format indicator channel (PCFICH), a physical hybrid-ARQ indicator channel (PHICH), and a physical uplink control channel (PUCCH), which are control channels.

Control information transmitted through the PDCCH is referred to as downlink control information (DCI). The DIC may include resource allocation (also referred to as a downlink grant) of the PDSCH, resource allocation (also referred to an uplink grant) of the PUSCH, a set of transmission power control commands for individual UEs within any UE group, and/or activation of Voice over Internet Protocol (VoIP).

The PCFICH transmitted at a first OFDM symbol of the subframe carries a control format indicator (CFI) on the number of OFDM symbols (that is, a size of a control region) used for transmission of the control channels within the subframe. The user equipment receives the CFI on the PCFICH and then monitors the PDCCH.

The PHICH carries a positive-acknowledgement (ACK)/negative-acknowledgement (NACK) signal for uplink hybrid automatic repeat request (HARQ). The ACK/NACK signal for uplink data transmitted by the user equipment is transmitted on the PHICH.

The 3GPP LTE uses synchronous HARQ in uplink transmission and uses asynchronous HARQ in downlink transmission. In the case of the synchronous HARQ, retransmission timing is fixed. On the other hand, in the case of the asynchronous HARQ, the retransmission timing is not fixed. That is, in the case of the synchronous HARQ, initial transmission and retransmission are performed at a predetermined HARQ period.

Figure 3:
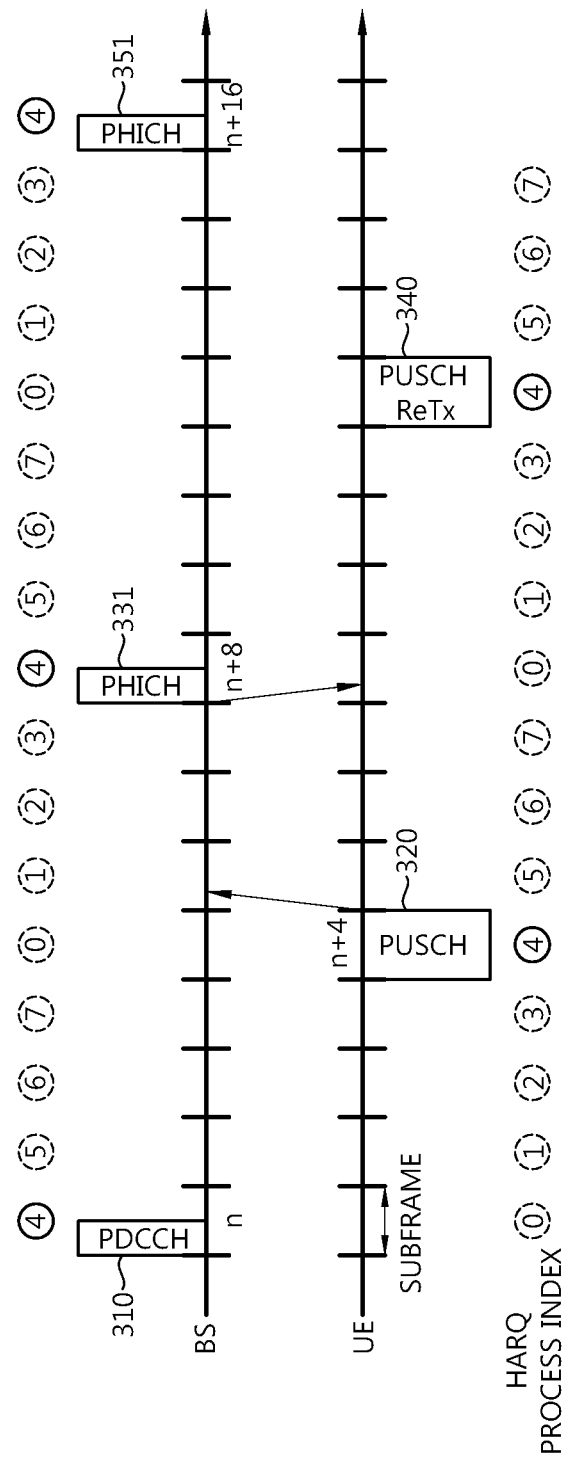
FIG. 3 shows synchronous uplink HARQ in the 3GPP LTE.

FIG. 3 shows synchronous uplink HARQ in the 3GPP LTE.

The user equipment receives initial uplink resource allocation from the base station on a PDCCH 310 in an $n^{th}$ subframe.

The user equipment transmits an uplink transmission block on a PUSCH 320 in an $n+4^{th}$ subframe using the initial uplink resource allocation.

The base station transmits an ACK/NACK signal for the uplink transmission block on a PHICH 331 in an $n+8^{th}$ subframe. The ACK/NACK signal indicates reception acknowledgement for the uplink transmission block. More specifically, the ACK signal indicates reception success, and the NACK signal indicates reception failure.

The user equipment receiving the NACK signal transmits a retransmission block on a PUSCH 340 in an $n+12^{th}$ subframe.

The base station transmits an ACK/NACK signal for the uplink transmission block on a PHICH 351 in an $n+16^{th}$ subframe.

Since the retransmission is performed in the $n+12^{th}$ subframe after the initial transmission is performed in the $n+4^{th}$ subframe, synchronous HARQ is performed at a HARQ period of eight subframes.

In the 3GPP LTE, eight HARQ processes may be performed, and each HARQ process is indexed from 0 to 7. The above-mentioned example shows that the HARQ is performed in a HARQ process index 4.

Figure 4:
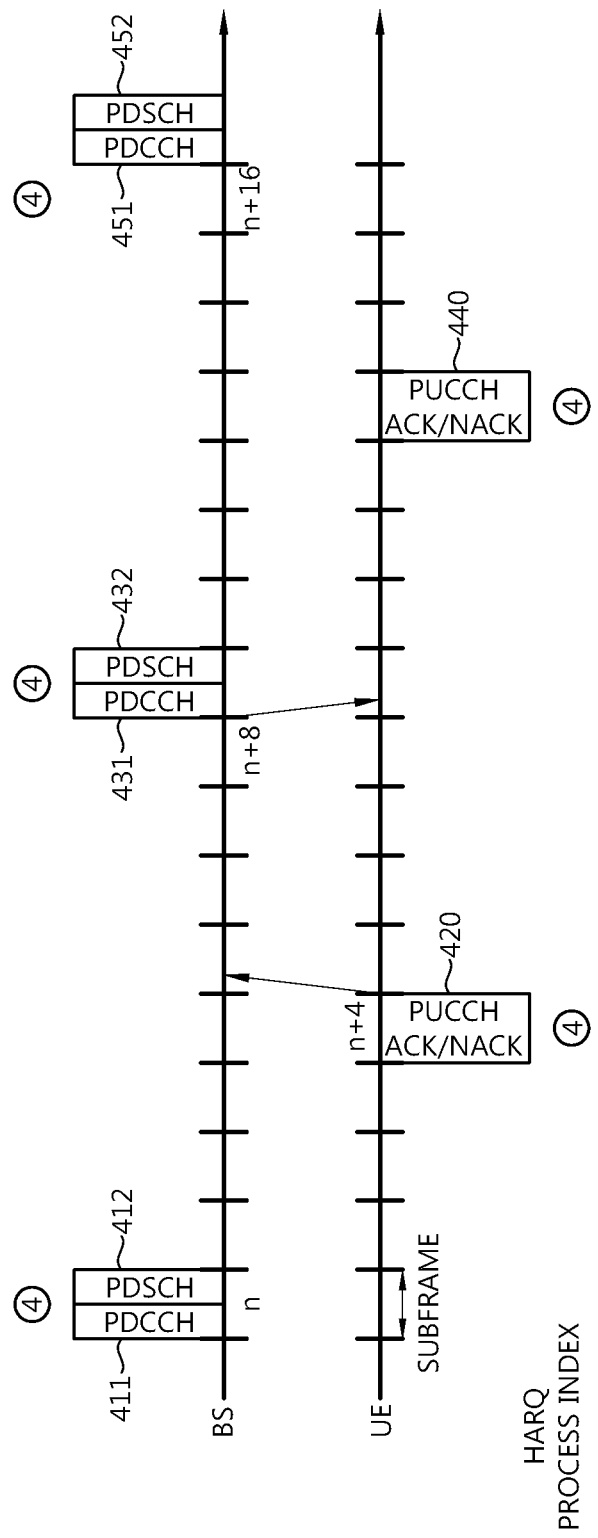
FIG. 4 shows asynchronous downlink HARQ in the 3GPP LTE.

FIG. 4 shows asynchronous downlink HARQ in the 3GPP LTE.

The base station transmits a downlink transmission block to the user equipment on a PDSCH 412 indicated by downlink resource allocation on a PDCCH 411 in an $n^{th}$ subframe.

The user equipment transmits an ACK/NACK signal on a PUCCH 420 in an $n+4^{th}$ subframe. Resources of the PUCCH 420 used for transmission of the ACK/NACK signal are determined based on resources of the PDCCH 411 (for example, an index of a first CCE used for transmission on the PDCCH 411).

Even though the base station receives the NACK signal from the user equipment, it does not necessarily perform retransmission in an $n+8^{th}$ subframe, unlike the uplink HARQ. Instead, the base station transmits a retransmission block on a PDSCH 432 indicated by downlink resource allocation on a PDCCH 431 in an $n+9^{th}$ subframe.

The user equipment transmits an ACK/NACK signal on a PUCCH 440 in an $n+13^{th}$ subframe.

According to the asynchronous HARQ, even though the base station receives retransmission request from the user equipment, it does not necessarily perform the retransmission in a defined cycle.

Figure 5:
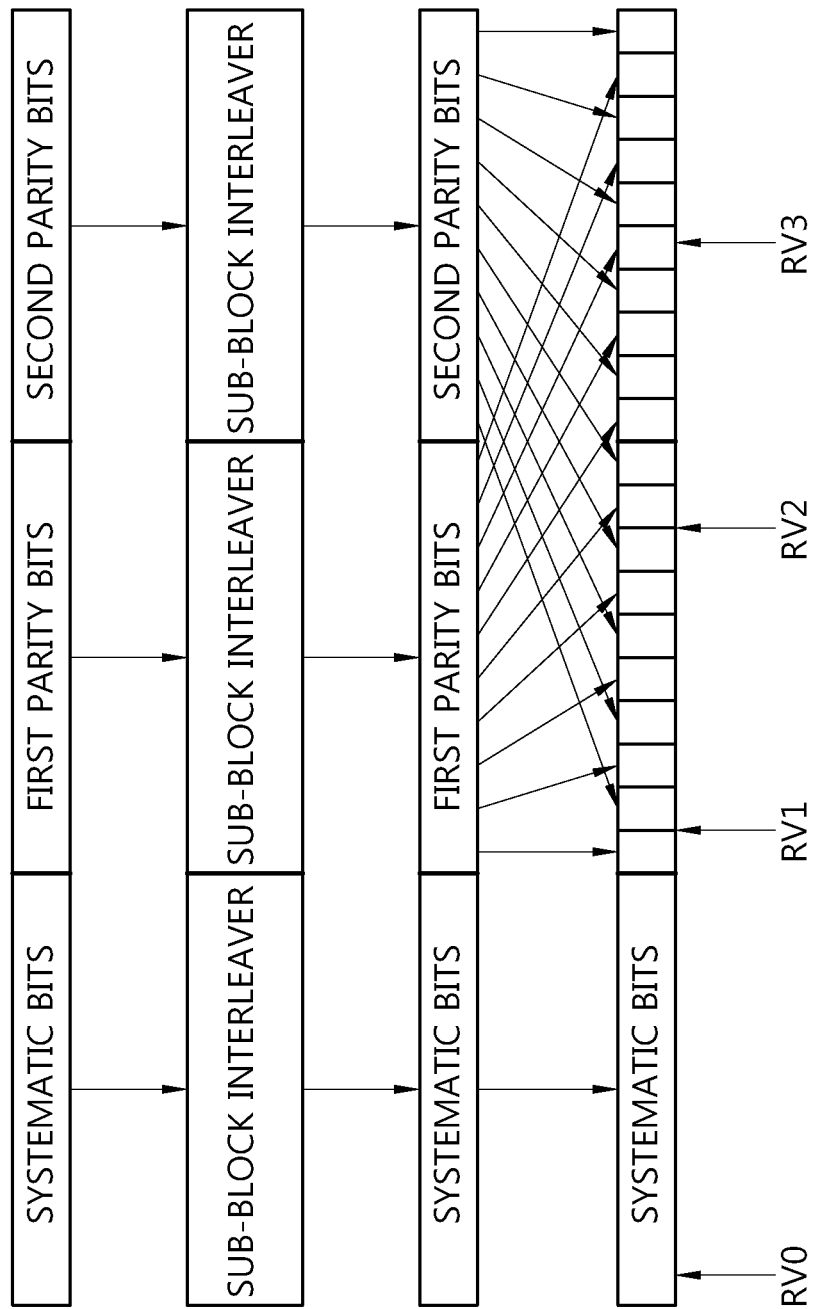
FIG. 5 shows an example of channel coding in the 3GPP LTE.

FIG. 5 shows an example of channel coding in the 3GPP LTE. This may refer to section 5.1 of 3GPP TS 36.212 V8.5.0 (2008-12).

A code block includes systematic bits, first parity bits, and second parity bits. The code block is interleaved through a sub-block interleaves. The interleaved code block is stored in a Kw circular buffer to thereby configure a mother transmission block. Here, a size of the circular buffer may be adjusted according to a size of a buffer of the user equipment. The code block may be rate matched according to a size of a receiving buffer of the user equipment.

In the case of the 3GPP LTE, since incremental redundancy (IR) type HARQ is used, redundancy versions (RV) are changed for each retransmission. An initial position within the buffer for retransmission is defined according to the RV.

An initial transmission block of the HARQ is configured of a data block starting from RV0 in the mother transmission block and having a predetermined length, and a first retransmission block from RV1 in the mother transmission block and having a predetermined length.

Figure 6:
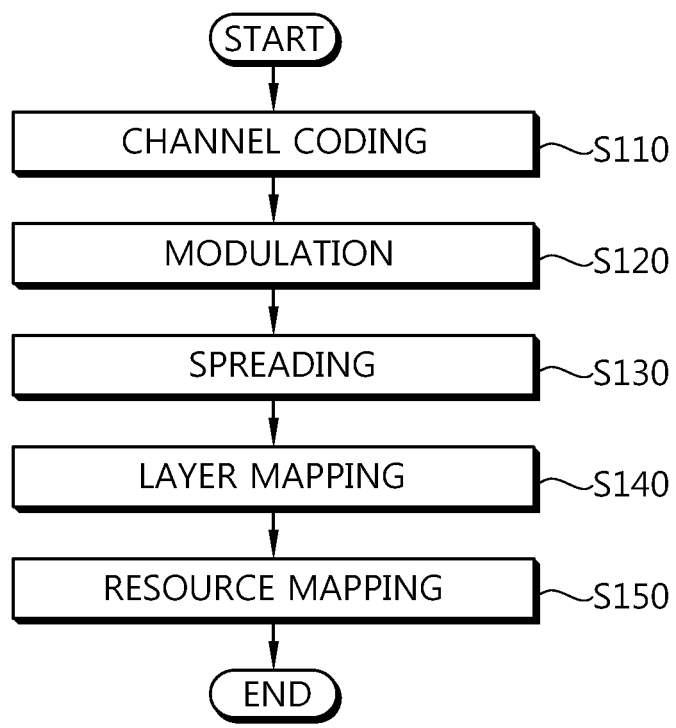
FIG. 6 is a flow chart showing a configuration of a PHICH.

FIG. 6 is a flow chart showing a configuration of a PHICH. Since the LTE system does not support single user-multiple input multiple output (SU-MIMO) in the uplink, a PHICH carries 1 bit of ACK/NACK signal corresponding to a PUSCH for a single user equipment.

In step S110, 1 bit of ACK/NACK signal is channel-coded using repetition coding at a code rate of ⅓. In step S120, the ACK/NACK signal coded with 3 bits of codeword is mapped to three modulated symbols through binary phase shift keying (BPSK) modulation. In step S130, the modulated symbols is spread using spreading factors $N^{PHICH}_{SF}$ and orthogonal sequences. The number of orthogonal sequences used for the spreading is two times as much as $N^{PHICH}_{SF}$ in order to apply I/Q multiplexing. $2N^{PHICH}_{SF}$ PHICHs spread using $2N^{PHICH}_{SF}$ orthogonal sequences are defined as a single PHICH group. The PHICHs belonging to the same PHICH group are distinguished from each other through other orthogonal sequences. In step S140, the spread symbols are layer-mapped according to a rank. In step S250, each of the layer mapped symbols is mapped to resource elements.

According to section 6.9 of 3GPP TS 36.211 V8.5.0 (2008-12), resources of a PHICH corresponding to a PUSCH are defined using the lowest physical resource block (PRB) index $I^{lowest\_index}_{PRB\_RA}$ used in the PUSCH and a circulation shift nDMRS of a reference signal for data demodulation used in the PUSCH. The reference signal for data demodulation indicates a reference used to demodulate data transmitted on the PUSCH. More specifically, the resources of the PHICH are known by an index pair $(n^{group}_{PHICH}, n^{seq}_{PHICH})$. $n^{group}_{PHICH}$ indicates a PHICH group number and $n^{seq}_{PHICH}$ indicates an orthogonal sequence index within the PHICH group. $n^{group}_{PHICH}$ and $n^{seq}_{PHICH}$ are given as follows:

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH} \quad \text{[Equation 1]}$$

where 'mod' indicates a modulo operation.

$n^{group}_{PHICH}$ has a value between 0 and $N^{group}_{PHICH}-1$, and the number $n^{seq}_{PHICH}$ of PHICH groups is given as follows:

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 2]}$$

where $N_g \in \{⅙, ½, 1, 2\}$ is given in an upper layer.

The orthogonal sequences used in the PHICH are given in the following Table 1.

TABLE 1

| Sequence Index $n^{seq}_{PHICH}$ | Orthogonal Sequence | |
|---|---|---|
| | Normal CP, $N^{PHICH}_{SF} = 4$ | Extended CP, $N^{PHICH}_{SF} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | |
| 5 | [+j −j +j −j] | |

TABLE 1-continued

| Sequence Index $n^{seq}_{PHICH}$ | Orthogonal Sequence | |
|---|---|---|
| | Normal CP, $N^{PHICH}_{SF}=4$ | Extended CP, $N^{PHICH}_{SF}=2$ |
| 6 | [+j +j −j −j] | |
| 7 | [+j −j −j +j] | |

As described above, the uplink HARQ of the 3GPP LTE is the synchronous HARQ. The synchronous HARQ has the following advantages as compared to the asynchronous HARQ.

First, there is no need to transmit a HARQ process index, such that a control signaling overhead is reduced. Second, complexity due to the performance of the HARQ may be reduced.

However, a HARQ scheme according to the conventional PHICH structure is a non-adaptive HARQ scheme in that it may be used only to transmit one bit of ACK/NACK signal and a transmission attribute may not additionally be changed.

An adaptive HARQ scheme is a scheme in which a transmission attribute used for each retransmission may be changed as compared to initial transmission. The adaptive HARQ scheme requires additional signaling for changing the transmission attribute; however, it may perform adaptive retransmission according to a state of a channel, thereby making it possible to raise success probability at the time of retransmission.

Figure 7:
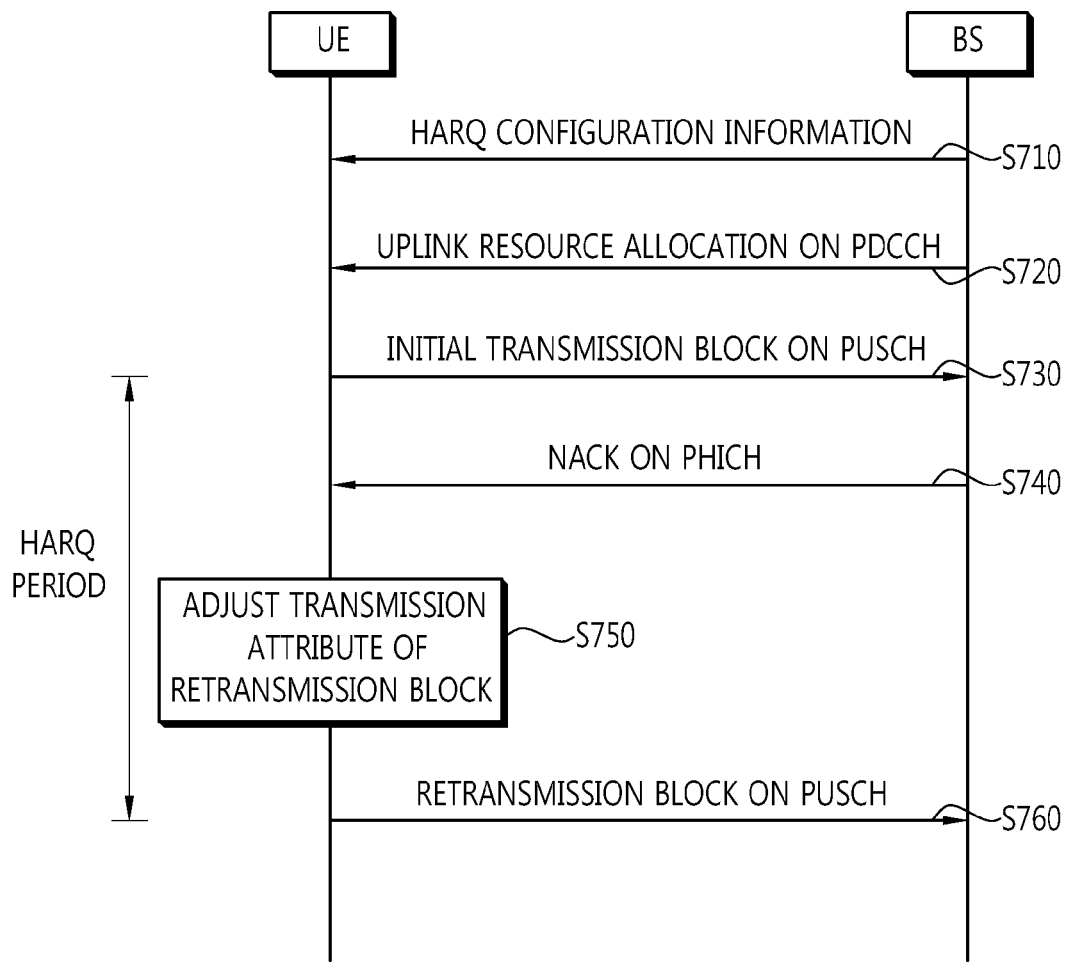
FIG. 7 is a flow chart showing a method for performing synchronous/adaptive uplink HARQ according to an exemplary embodiment of the present invention.

FIG. 7 is a flow chart showing a method for performing synchronous/adaptive uplink HARQ according to an exemplary embodiment of the present invention.

In step S710, the user equipment receives HARQ configuration information from the base station. The HARQ configuration information is information for performing the synchronous/adaptive uplink HARQ. The HARQ configuration information may be broadcasted as a portion of system information or be transmitted through a user equipment specific message. The user equipment specific message may be a RRC message or a MAC message. The user equipment may determine a HARQ operation mode and/or adaption information through the HARQ configuration information. The HARQ operation mode may indicate whether or not the synchronous HARQ is performed and/or whether or not the adaptive HARQ is performed. The adaption information indicates a change in transmission attribute in the retransmission as compared to the initial transmission. A more detailed description will be provided below.

In step S720, the base station transmits uplink resource allocation (also referred to as an uplink grant) to the user equipment on the PDCCH.

In step S730, the user equipment transmits an initial transmission block to the base station on the PUSCH by using the uplink resource allocation.

In step S740, the base station determines whether or not there is an error in the initial transmission block and transmits the reception acknowledgement on the PHICH. The resources used for transmission of the PHICH are determined from the resources of the PUSCH as described above. FIG. 7 illustrates that a NACK signal is transmitted because the error is detected in the initial transmission block.

In step S750, the user equipment adjusts a transmission attribute of a retransmission block based on the HARQ configuration information. The adjusted transmission attribute may be a rank, a modulation order, a size of a resource block, transmission power, or the like, which will be described below.

In step S760, the user equipment transmits the retransmission block on the PUSCH. Here, the initial transmission block and the retransmission block are transmitted at a predetermined HARQ period. For example, a HARQ period may be eight subframes. When the initial transmission block is transmitted in an $n^{th}$ subframe, the retransmission block is transmitted in an $n+8^{th}$ subframe.

Although one time retransmission has been described above, when the NACK signal is received, maximally M-time (M>1) retransmission may be performed. The transmission attribute may be adaptively adjusted for each retransmission based on the HARQ configuration information.

The adaptive HARQ is set through a semi-static message such as an upper layer message. The HARQ retransmission may be applied so as to reduce a signaling overhead and allow a receiver to have better decoding performance.

Hereinafter, the proposed adaptive HARQ scheme will be described. With respect to the synchronous/adaptive uplink HARQ, the following adaption scheme may be considered.

The adaptive HARQ is a scheme of changing the transmission attribute in the retransmission as compared to the initial transmission. The changed transmission attribute includes at least any one of a MIMO mode, a modulation and coding scheme (MCS), a transmission block size, and a retransmission period. The MIMO mode includes at least any one of a rank, a precoding matrix indicator (PMI), a spatial multiplexing mode, and a spatial diversity mode.

Hereinafter, a change in channel coding is not considered for the retransmission block. That is, it is assumed that the systematic bits and the parity bits of the code block are not change even though they are retransmitted. However, when a higher coding gain is required, a change in channel coding may also be considered.

First Exemplary Embodiment: Rank Down Scheme

As the transmission attribute adjusted at the time of the retransmission, a rank may be considered. The rank down scheme is a scheme of applying a rank lower than a rank applied to the initial transmission block to the retransmission block.

In the case of the 3GPP LTE according to the related art, since only a single transmission antenna is considered in the uplink, only rank 1 is possible. Therefore, the same rank cannot but be always applied. When a plurality of transmission antennas are used in the uplink transmission, the rank may be changed.

A high rank is vulnerable to channel variation. As a rank becomes lower, a transmission rate is decreased but transmission reliability may be further increased. In addition, the rank down scheme may be efficient since it is not influenced by the channel variation even though the retransmission is significantly delayed due to a relatively long HARQ period in the synchronous HARQ.

Table 1 shows an example of the rank down scheme according to the ranks supported by the user equipment.

TABLE 2

| Supported Rank | Initial Transmission | First Retransmission | Second Retransmission | Third Retransmission |
|---|---|---|---|---|
| 1 | 1 | 1 | 1 | 1 |
| 2 | 2 | 2 | 2 | 1 |
|   | 2 | 2 | 1 | 1 |
|   | 2 | 1 | 1 | 1 |
| 3 | 3 | 3 | 3 | 2 |
|   | 3 | 3 | 2 | 2 |
|   | 3 | 2 | 2 | 2 |
|   | 3 | 3 | 2 | 1 |
|   | 3 | 2 | 2 | 1 |
|   | 3 | 2 | 1 | 1 |

TABLE 2-continued

| Supported Rank | Initial Transmission | First Retransmission | Second Retransmission | Third Retransmission |
|---|---|---|---|---|
| 4 | 4 | 4 | 4 | 3 |
|   | 4 | 4 | 3 | 3 |
|   | 4 | 3 | 3 | 3 |
|   | 4 | 4 | 3 | 2 |
|   | 4 | 3 | 3 | 2 |
|   | 4 | 3 | 2 | 2 |
|   | 4 | 3 | 2 | 1 |
|   | 4 | 4 | 4 | 2 |
|   | 4 | 4 | 2 | 2 |
|   | 4 | 2 | 2 | 2 |
|   | 4 | 4 | 2 | 1 |
|   | 4 | 2 | 1 | 1 |
|   | 4 | 2 | 2 | 1 |
|   | 4 | 4 | 4 | 1 |
|   | 4 | 4 | 3 | 1 |
|   | 4 | 3 | 1 | 1 |

The rank down of Table 2 is only an example and other combinations are possible. In addition, some elements may be removed or other elements may be further added.

The user equipment may adjust the rank according to the rank that it supports. For example, when the user equipment supports rank 2 and the HARQ configuration information sets 0 as a rank adjustment index, (2, 2, 2, 1) of Table 2 is used. When the user equipment supports rank 3 and the HARQ configuration information sets 2 as the rank adjustment index, (3, 2, 2, 2) of Table 2 is used. When the user equipment supports rank 4 and the HARQ configuration information sets 2 as the rank adjustment index, (4, 3, 3, 3) of Table 2 is used.

Second Exemplary Embodiment: Modulation Change Scheme

As the transmission attribute adjusted at the time of the retransmission, a modulation order may be considered. The modulation change scheme is a scheme of applying a modulation order lower than a modulation order applied to the initial transmission block to the retransmission block.

In the IR type HARQ, only the parity bits of the code block may be included in the retransmission block according to the RV. Since the parity bits generally operate more robustly during a channel decoding process, the modulation order of the retransmission block is lowered, thereby making it possible to raise reliability of the parity bits.

Table 3 shows an example of the modulation change scheme.

TABLE 3

| Index | Initial Transmission | First Retransmission | Second Retransmission | Third Retransmission |
|---|---|---|---|---|
| 0 | QPSK | QPSK | QPSK | QPSK |
| 1 | 16QAM | 16QAM | 16QAM | QPSK |
| 2 | 16QAM | 16QAM | QPSK | QPSK |

TABLE 3-continued

| Index | Initial Transmission | First Retransmission | Second Retransmission | Third Retransmission |
|---|---|---|---|---|
| 3 | 16QAM | QPSK | QPSK | QPSK |
| 4 | 64QAM | 64QAM | 64QAM | 16QAM |
| 5 | 64QAM | 64QAM | 16QAM | 16QAM |
| 6 | 64QAM | 16QAM | 16QAM | 16QAM |
| 7 | 64QAM | 64QAM | 16QAM | QPSK |
| 8 | 64QAM | 16QAM | 16QAM | QPSK |
| 9 | 64QAM | 16QAM | QPSK | QPSK |

Although Table 3 shows an exemplary modulation change scheme with respect to quadrature phase shift keying (QPSK), 16-quadrature amplitude modulation (16QAM), 64QAM, a modulation change scheme may also be configured by combining a lower modulation order (for example, binary phase shift keying (BPSK), or the like) or a higher modulation order (for example, 256QAM, or the like).

The user equipment may adjust the modulation order based on the HARQ configuration information. For example, when the HARQ configuration information sets 0 as a modulation change index, (QPSK, QPSK, QPSK, QPSK) of Table 3 is used. When the HARQ configuration information sets 7 as the modulation change index, (64QAM, 64QAM, 16QAM, QPSK) of Table 3 is used.

Third Exemplary Embodiment: Rank Down and Modulation Change Scheme

As the transmission attribute adjusted at the time of the retransmission, both of the rank and the modulation order may be simultaneously considered. This scheme is a scheme of applying a rank and a modulation order that are lower than a rank and/or a modulation order applied to the initial transmission block to the retransmission block.

When the rank becomes lower, a signal-to-noise (SNR) ratio operation range may be excessively changed. The modulation order is defined in order to represent granularity of an operating point. When the modulation order is lowered by 1 level (for example, from 16QAM to QPSK), an effective operating range is decreased by about 3 dB. This lowers a target block error rate (BLER) to thereby have an effect on decoding probability of the receiver. When the rank is lowered by 1, a change in an operating range that is significantly larger as compared to a case in which the modulation order is lowered by 1 level may be caused. Therefore, when the changes in both of the rank and the modulation order are considered, a gain may be obtained.

For example, in order to prevent an excessive change in an operating range, the modulation order is raised simultaneously with the lowering of the rank. Alternatively, only the modulation order may be lowered in the first retransmission, only the rank may be lowered in the second retransmission, and both of the modulation order and the rank may be lowered at the third retransmission. This may reduce a rapid change in an operating range.

Table 4 shows an example of the rank down and modulation change scheme.

TABLE 4

| Index | Initial Transmission | First Retransmission | Second Retransmission | Third Retransmission |
|---|---|---|---|---|
| 0 | Rank 2, QPSK | Rank 1, 16QAM | Rank 1, QPSK | Rank 1, QPSK |
| 1 | Rank 2, 16QAM | Rank 2, QPSK | Rank 1, 16QAM | Rank 1, QPSK |
| 2 | Rank 2, 64QAM | Rank 2, 16QAM | Rank 1, 64QAM | Rank 1, 16QAM |
| 3 | Rank 2, 64QAM | Rank 2, 16QAM | Rank 1, 16QAM | Rank 1, QPSK |
| 4 | Rank 3, QPSK | Rank 2, 16QAM | Rank 2, QPSK | Rank 2, QPSK |
| 5 | Rank 3, 16QAM | Rank 3, QPSK | Rank 2, 16QAM | Rank 2, QPSK |

TABLE 4-continued

| Index | Initial Transmission | First Retransmission | Second Retransmission | Third Retransmission |
|---|---|---|---|---|
| 6 | Rank 3, 16QAM | Rank 3, 16QAM | Rank 2, 16QAM | Rank 2, QPSK |
| 7 | Rank 3, 64QAM | Rank 3, 16QAM | Rank 2, 64QAM | Rank 2, 16QAM |
| 8 | Rank 3, 64QAM | Rank 3, 16QAM | Rank 2, 16QAM | Rank 1, 16QAM |
| 9 | Rank 4, QPSK | Rank 4, QPSK | Rank 3, 16QAM | Rank 2, 16QAM |
| 10 | Rank 4, 16QAM | Rank 4, QPSK | Rank 3, 16QAM | Rank 3, QPSK |
| 11 | Rank 4, 16QAM | Rank 4, 16QAM | Rank 3, 16QAM | Rank 3, QPSK |
| 12 | Rank 4, 16QAM | Rank 4, QPSK | Rank 3, QPSK | Rank 2, QPSK |
| 13 | Rank 4, 64QAM | Rank 4, 16QAM | Rank 3, 64QAM | Rank 3, 16QAM |
| 14 | Rank 4, 64QAM | Rank 4, 16QAM | Rank 3, 16QAM | Rank 2, 16QAM |
| 15 | Rank 4, 64QAM | Rank 4, 16QAM | Rank 3, 64QAM | Rank 2, 64QAM |
| 16 | Rank 4, 64QAM | Rank 4, 64QAM | Rank 3, 16QAM | Rank 2, 16QAM |

Table 4 is only an example. Those skilled in the art may configure various rank down and modulation change schemes by combining various ranks (1, 2, 3, 4 . . . ) and various modulation orders (BPSK, QPSK, 16QAM, 64QAM, 256QAM . . . ).

Fourth Exemplary Embodiment: Changes in Radio Resource/Transmission Power

As the transmission attribute adjusted at the time of the retransmission, a radio resource and/or transmission power may be considered. The HARQ configuration information may include information on a change in a radio resource and/or a change in transmission power.

The change in radio resource is to change an amount of radio resource allocated to the retransmission. For example, the number of resource blocks allocated to the PUSCH used for the retransmission is changed as compared to the PUSCH used for the initial transmission. When the modulation order of the retransmission is lowered and more resource blocks are thus required, the number of resource blocks allocated to the retransmission may be increased. The HARQ configuration information may include information indicating the number of resource blocks changed at the time of the retransmission.

The change in transmission power is to adjust the transmission power according to the retransmission. When previous transmission has failed, the transmission power used for the previous transmission may not be appropriate for the retransmission. Therefore, the user equipment increases a level of transmission power at the time of the retransmission. Alternatively, when it is assumed that the receiver attempts to perform decoding by combining the retransmission block with the block transmitted in the previous transmission, the level of transmission power may also be reduced at the time of the retransmission. This may be represented by $P_{tx}=P_{init}+P_{delta}$. Where $P_{tx}$ indicates a level of transmission power, $P_{init}$ indicates a level of initial transmission power, and $P_{delta}$ indicates an offset of retransmission power and may be a negative value or a positive value. The HARQ configuration information may indicate $P_{delta}$.

Fifth Exemplary Embodiment: Retransmission Diversity

As the transmission attribute adjusted at the time of the retransmission, diversity may be considered. As a method for obtaining a diversity effect, a constellation rearrangement method, a subcarrier mapping method, or an interleaving method may be used. The HARQ configuration information may include information indicating a method for obtaining the diversity effect.

The constellation rearrangement method is a method of rotating or rearranging constellation used for the initial transmission to thereby map constellation bits on the same constellation to other modulation symbols at the time of the retransmission. For example, in BPSK modulation, when bits are mapped to an I axis on a constellation at the time of initial transmission, they are mapped to a Q axis on the constellation at the time of retransmission. Each constellation bit may have different error rates. Therefore, decoding performance may be improved through the constellation rearrangement.

Alternatively, unequal error probability (UEP) may be applied to the systematic bits and the parity bits of the code block. The systematic bits are mapped to constellation points having higher reliability, and the parity bits are mapped to constellation points having reliability lower than that of the constellation points to which the systematic bits are mapped, on the constellation. Alternatively, the systematic bits are mapped to constellation points having lower reliability, and the parity bits are mapped to constellation points having reliability higher than that of the constellation points to which the systematic bits are mapped, on the constellation.

The mapping of subcarriers used for the initial transmission and the mapping of subcarriers used for the retransmission may be different. The reason is that frequency characteristics may be different according to positions of allocated subcarriers. Frequency first mapping or time first mapping may be alternately performed according to the number of retransmission attempts. When one resource block includes 7×12 resource elements, the frequency first mapping is to first map the resource elements to twelve subcarriers in a first OFDM symbol and then map the resource elements to twelve subcarriers in the next OFDM symbol. The time first mapping is to first map the resource elements to first subcarriers of each of seven OFDM symbols and then map the resource elements to the next subcarriers of each of the seven OFDM symbols.

In addition, a position of the radio resource may be changed at the time of the retransmission. A pattern in which the allocated resource blocks are disposed at the time of the retransmission is defined, and the allocated resource blocks may be disposed for each retransmission according to the defined pattern. The resource blocks are disposed in different time or frequency domains for each retransmission according to the pattern thereof, thereby making it possible to obtain time/frequency diversity gains. The HARQ configuration information may include information indicating a pattern of the radio resource.

Five exemplary embodiments for adaptive HARQ described above may be implemented independently from each other or be combined. For example, the rank down scheme may be applied together with the change in transmission power.

Figure 8:
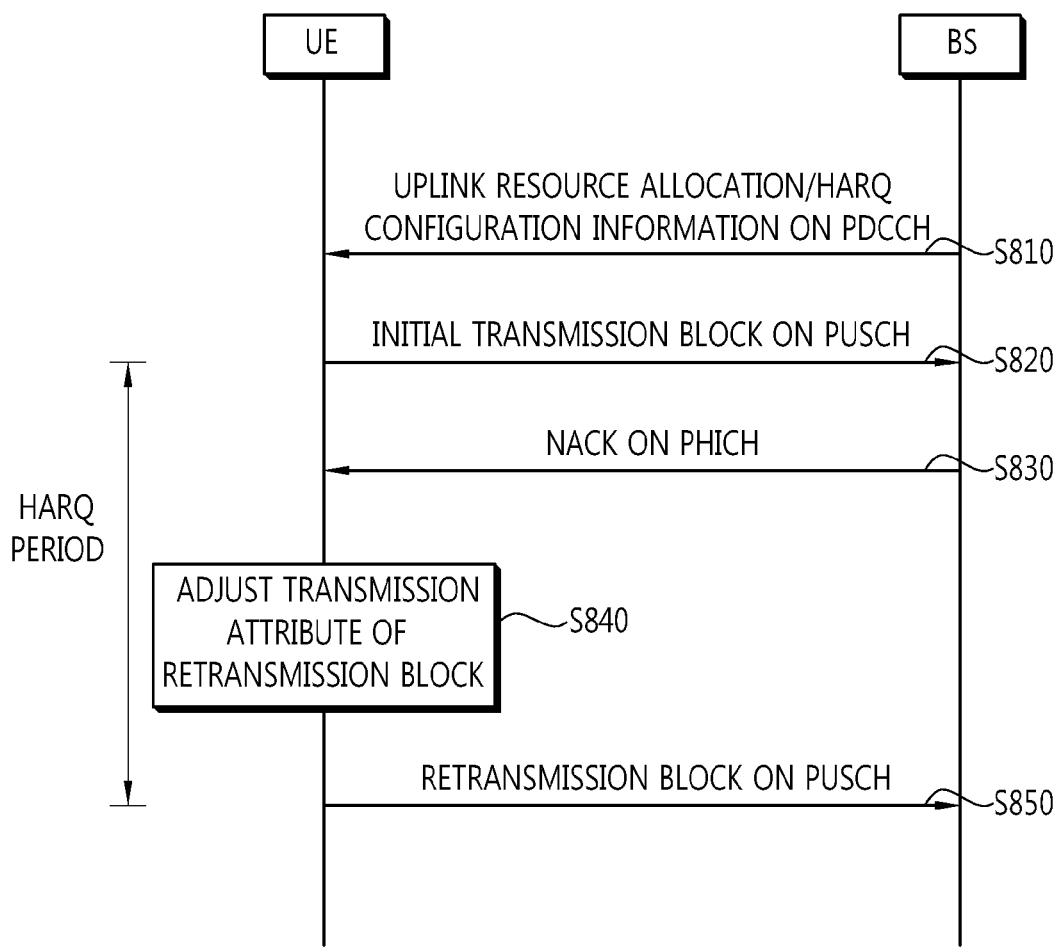
FIG. 8 is a flow chart showing a method for performing synchronous/adaptive uplink HARQ according to another exemplary embodiment of the present invention.

FIG. 8 is a flow chart showing a method for performing synchronous/adaptive uplink HARQ according to another exemplary embodiment of the present invention.

In step S810, the base station transmits uplink resource allocation and HARQ configuration information to the user equipment on the PDCCH. In contrast with the exemplary embodiment of FIG. 7, the HARQ configuration information is dynamically transferred on the PDCCH. Therefore, the user equipment may perform the synchronous/adaptive uplink HARQ based on different HARQ configuration information for each HARQ process. A new format of DCI may be defined in order to transmit the HARQ configuration information.

In step S820, the user equipment transmits an initial transmission block to the base station on the PUSCH by using the uplink resource allocation.

In step S830, the base station determines whether or not there is an error in the initial transmission block and transmits the reception acknowledgement on the PHICH. The resources used for transmission of the PHICH are determined from the resources of the PUSCH as described above. FIG. 8 illustrates that a NACK signal is transmitted because the error is detected in the initial transmission block.

The base station may transmit the uplink resource allocation for retransmission to the user equipment on the PDCCH, in addition to the ACK/NACK signal. At this time, the base station also transmits the HARQ configuration information, thereby making it possible to adaptively change the HARQ setting. The uplink resource allocation for the retransmission may be transmitted at a cycle different from the PHICH. For example, the base station receiving the initial transmission block in an $n^{th}$ subframe may transmit the ACK/NACK signal in an $n+k^{th}$ subframe and transmit the uplink resource allocation for the retransmission in an $n+k+p^{th}$ subframe, where 'n' indicates a number of the subframe used for the initial PUSCH transmission, 'k' indicates an offset of the subframe used for the PHICH transmission and is larger than 1, and 'p' indicates an offset of the subframe used for the uplink resource allocation for the retransmission and is equal to or larger than 0.

In step S840, the user equipment adjusts a transmission attribute of a retransmission block based on the HARQ configuration information.

In step S850, the user equipment transmits the retransmission block on the PUSCH. Here, the initial transmission block and the retransmission block are transmitted at a predetermined HARQ period. For example, a HARQ period may be eight subframes. When the initial transmission block is transmitted in an $n^{th}$ subframe, the retransmission block is transmitted in an $n+8^{th}$ subframe.

The adaptive HARQ is set through a dynamic message. The transmission attribute may be dynamically changed, thereby making it possible to raise performance of the adaptive HARQ.

Figure 9:
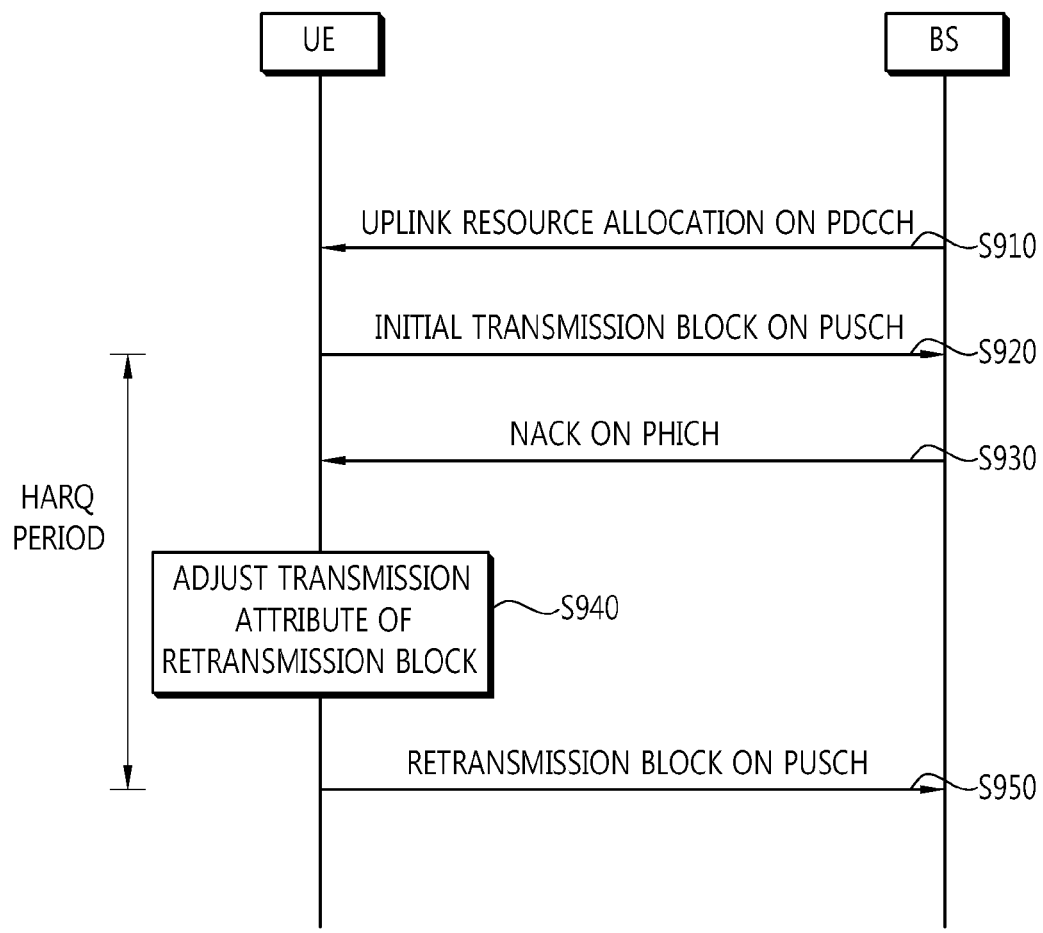
FIG. 9 is a flow chart showing a method for performing synchronous/adaptive uplink HARQ according to still another exemplary embodiment of the present invention.

FIG. 9 is a flow chart showing a method for performing synchronous/adaptive uplink HARQ according to still another exemplary embodiment of the present invention.

In step S910, the base station transmits uplink resource allocation to the user equipment on the PDCCH.

In operation (S920), the user equipment transmits an initial transmission block to the base station on the PUSCH by using the uplink resource allocation.

In operation (S930), the base station determines whether or not there is an error in the initial transmission block and transmits the reception acknowledgement on the PHICH. The resources used for transmission of the PHICH are determined from the resources of the PUSCH as described above. FIG. 9 illustrates that a NACK signal is transmitted because the error is detected in the initial transmission block.

In operation (S940), the user equipment adjusts a transmission attribute of a retransmission block based on the HARQ configuration information. In contrast with the embodiments of FIGS. 7 and 8 in which the base station informs the user equipment of the HARQ configuration information, the HARQ configuration information is predetermined between the base station and the user equipment. For example, when the rank down scheme is used, the initial transmission is predetermined as rank 4, the first retransmission is predetermined as rank 3, and the second retransmission is predetermined as rank 2, between the base station and the user equipment. This has advantages in that separate signaling is not required and an existing structure may be utilized as it is.

In step S950, the user equipment transmits the retransmission block on the PUSCH. Here, the initial transmission block and the retransmission block are transmitted at a predetermined HARQ period. For example, a HARQ period may be eight subframes. When the initial transmission block is transmitted in an $n^{th}$ subframe, the retransmission block is transmitted in an $n+8^{th}$ subframe.

Figure 10:
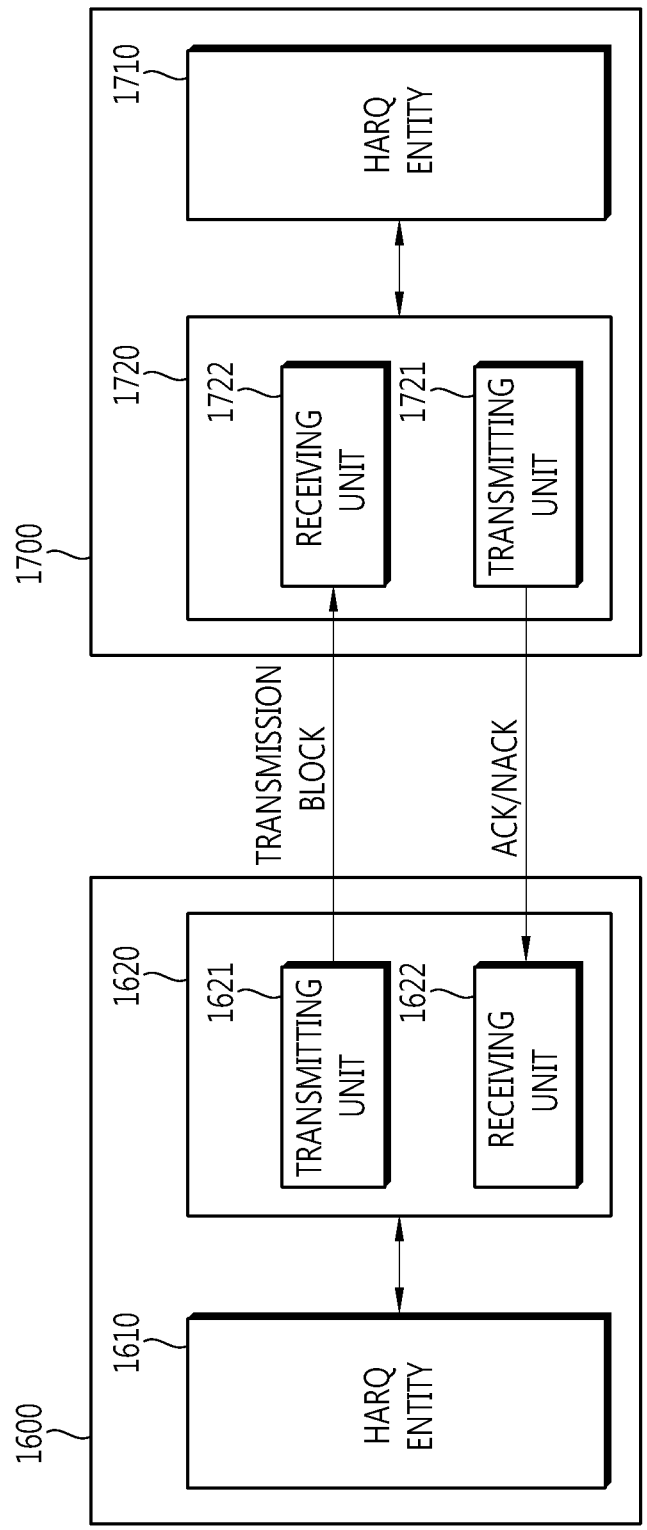
FIG. 10 is a block diagram of a user equipment and a base station that implements the exemplary embodiments of the present invention.

FIG. 10 is a block diagram of a user equipment and a base station that implements the exemplary embodiments of the present invention.

A user equipment 1600 includes a HARQ entity 1610 and a physical entity 1620. The physical entity 1620 includes a transmitting unit 1621 and a receiving unit 1622.

The HARQ entity 1610 performs an operation of the user equipment for the synchronous/adaptive HARQ in the embodiments of FIGS. 7 to 9 described above. The HARQ entity 1610 adjusts a transmission attribute of retransmission based on HARQ configuration information and informs the physical entity 1620 of the adjusted transmission attribute.

The transmitting unit 1621 transmits a transmission block, and the receiving unit 1622 receives an ACK/NACK signal, which is reception acknowledgement for the transmission block. The HARQ entity 160 may instruct the physical entity 1620 to retransmit the transmission block based on the reception acknowledgement.

A base station 1700 includes a HARQ entity 1710 and a physical entity 1720. The physical entity 1720 includes a transmitting unit 1721 and a receiving unit 1722. The HARQ entity 1710 performs an operation of the base station for the synchronous/adaptive HARQ in the embodiments of FIGS. 7 to 9 described above. The receiving unit 1722 receives the transmission block, and the transmitting unit 1721 transmits the ACK/NACK signal, which is the reception acknowledgement for the transmission block. The receiving unit 1722 may receive the retransmitted transmission block based on the reception acknowledgements.

The HARQ entities 1610 and 1710 and the physical entities 1620 and 1720 may be implemented by hardware or be a protocol implemented by a processor (not shown). The protocol is stored in a memory (not shown) and is executed by the processor.

Figure 11:
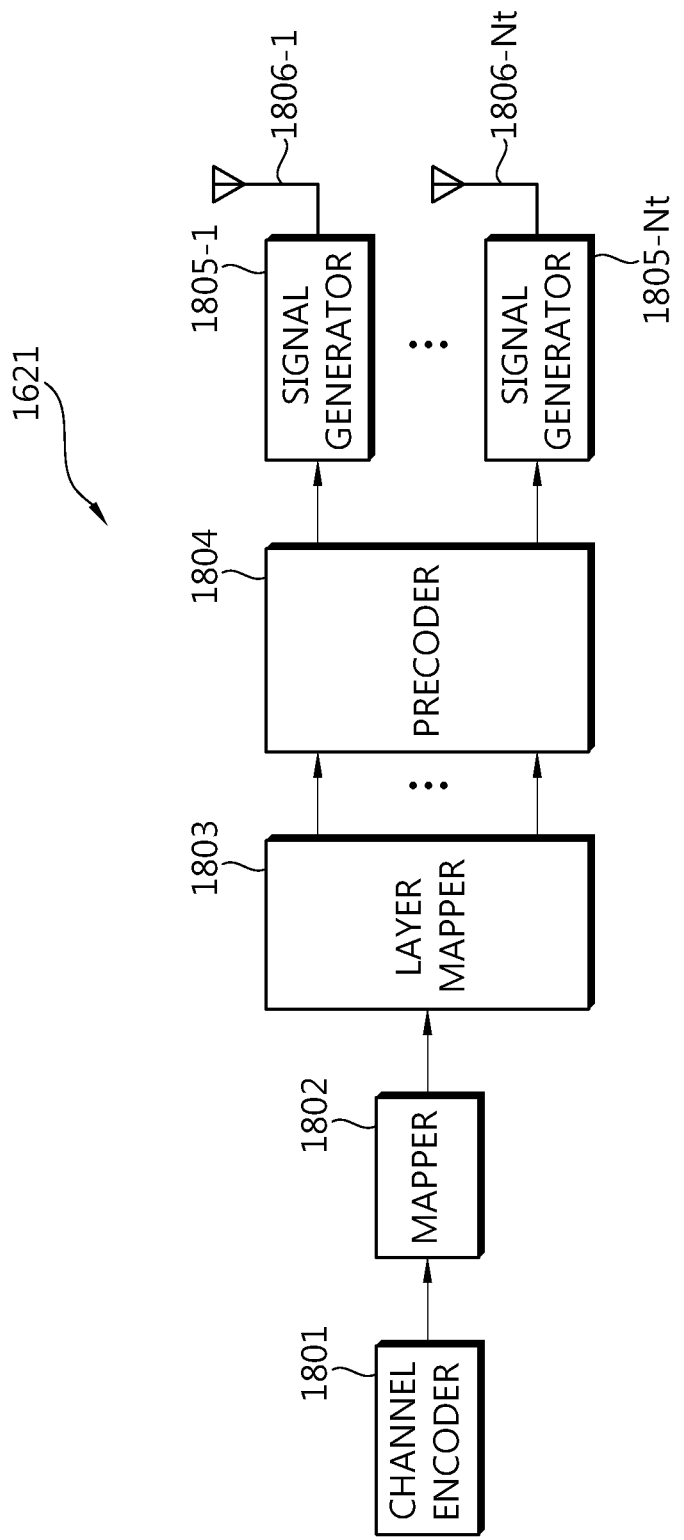
FIG. 11 is a block diagram showing an example of a transmitting unit of the user equipment.

FIG. 11 is a block diagram showing an example of a transmitting unit of the user equipment. The transmitting unit 1621 supports a multi-antenna.

The transmitting unit 1621 includes a channel encoder 1801, a mapper 1802, a layer mapper 1803, a precoder 1804, and signal generators 1805-1, . . . , 1805-Nt. 'Nt' indicates the number of antenna ports.

The channel encoder 1801 encodes input information bits according to a defined coding scheme to thereby generate a transmission block. The mapper 1802 maps the respective transmission blocks onto a constellation according to a modulation scheme to thereby map them to modulated symbols having a complex value. The layer mapper 1803 maps the modulated symbols to the respective layers. The layer may be referred to as an information path input to the precoder 1804 and the number of layers corresponds to a value of a rank. The precoder 1804 processes the symbols mapped to the respective layers in a MIMO scheme according to a plurality of antenna ports 1806-1, . . . , 1806-Nt to thereby output antenna specific symbols. The signal generators 1805-1, . . . , 1805-Nt convert the antenna specific symbols into transmission signals, which are transmitted through the respective antenna ports 1806-1, . . . , 1806-Nt. The signal generators 1805-1, . . . , 1805-Nt may perform OFDM modulation.

In the above examples, some methods have been described as a series of the steps or blocks on the basis of the flowcharts. It is, however, to be noted that the present invention is not limited to the sequences of the steps, and a certain step can be performed according to a different step and a different sequence or according to the same step and the same sequence, described above. Furthermore, those skilled in the art will appreciate that the steps illustrated in the flowcharts are not exclusive and other steps can be included in the flowcharts or one or more of the steps can be deleted without departing from the scope of the present invention.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations.

The invention claimed is:

1. A method for performing an uplink hybrid automatic repeat request (HARQ) in a wireless communications system, the method comprising:
   receiving, by a user equipment, HARQ configuration information from a base station;
   receiving, by the user equipment, first information on an allocation of an uplink radio resource from the base station;
   transmitting, by the user equipment, an initial transmission block on an uplink data channel using the first information to the base station;
   receiving, by the user equipment, a positive-acknowledgement/negative-acknowledgement (ACK/NACK) signal for the initial transmission block from the base station, wherein a downlink radio resource used for receiving the ACK/NACK signal is determined based on the uplink radio resource used for the transmission of the initial transmission block;
   receiving, by the user equipment, updated HARQ configuration information and second information on an allocation of the uplink radio resource together from the base station when the received ACK/NACK signal is an NACK signal;
   adjusting a transmission attribute of a retransmission block for the initial transmission block based on the updated HARQ configuration information when the received ACK/NACK signal is the NACK signal,
   wherein the adjustment of the transmission attribute is adaptively performed for each retransmission,
   wherein the adjusted transmission attribute includes a transmission power and a multiple input multiple output (MIMO) mode,
   wherein the MIMO mode includes a precoding matrix indicator (PMI), a spatial multiplexing mode, and a spatial diversity mode, and
   wherein the spatial diversity mode includes a constellation rearrangement mode, a subcarrier mapping mode, and an interleaving mode; and
   transmitting, by the user equipment, the retransmission block to the base station using the second information.

2. The method of claim 1, wherein the adjusted transmission attribute further includes a rank, a modulation order, and a number of resource blocks.

3. The method of claim 2, wherein the updated HARQ configuration information instructs the user equipment to set the rank of the retransmission block so as to be lower than a rank of the initial transmission block.

4. The method of claim 2, wherein the updated HARQ configuration information instructs the user equipment to set the modulation order of the retransmission block so as to be lower than a modulation order of the initial transmission block.

5. The method of claim 1, wherein the retransmission block is transmitted to the base station at a predetermined HARQ period.

6. The method of claim 1, wherein the HARQ configuration information or the updated HARQ configuration information is received through system information or a radio resource control (RRC) message.

7. The method of claim 1, wherein the HARQ configuration information is received together with the first information.

8. The method of claim 1, wherein the uplink data channel is a physical uplink shared channel (PUSCH), and a downlink control channel is a physical hybrid-ARQ indicator channel (PHICH).

9. The method of claim 1, wherein:
   when the received ACK/NACK signal is the NACK signal, the transmission power is adjusted according to the following equation:

$P_{tx} = P_{init} + P_{delta}$ where $P_{tx}$ indicates an adjusted transmission power, $P_{init}$ indicates a level of initial transmission power, and $P_{delta}$ indictates an offset of retransmission.

10. The method of claim 9, wherein the updated HARQ configuration information includes the $P_{delta}$.

11. The method of claim 1, wherein the adjusted transmission attribute further includes a retransmission cycle.

12. The method of claim 11, wherein when the initial transmission block is transmitted in an $n^{th}$ subframe and when the NACK signal is received in $n+k^{th}$ subframe, the retransmission block is transmitted in $n+k+p^{th}$ subframe where k is an offset of the subframe used for the ACK/NACK signal and is greater than 1, and p indicates an offset of the subframe used for retransmission.

* * * * *